United States Patent
Koshizuka et al.

(10) Patent No.: US 8,217,536 B2
(45) Date of Patent: Jul. 10, 2012

(54) MAGNETIZING INRUSH CURRENT SUPPRESSION DEVICE FOR TRANSFORMER AND CONTROL METHOD OF SAME

(75) Inventors: Tadashi Koshizuka, Minami-ku (JP); Minoru Saito, Kamakura-ku (JP); Koichi Futagami, Midori-ku (JP); Hiroshi Kusuyama, Izumi-ku (JP); Yoshimasa Sato, Nakahara-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 353 days.

(21) Appl. No.: 12/486,186

(22) Filed: Jun. 17, 2009

(65) Prior Publication Data
US 2010/0039737 A1 Feb. 18, 2010

(30) Foreign Application Priority Data

Jun. 20, 2008 (JP) ................................ 2008-162474

(51) Int. Cl.
*H01H 33/59* (2006.01)
*H02H 7/04* (2006.01)
*H02H 3/26* (2006.01)
(52) U.S. Cl. ............................ 307/113; 361/35; 361/76
(58) Field of Classification Search .................. 361/35, 361/76; 307/113; 323/908
See application file for complete search history.

(56) References Cited

U.S. PATENT DOCUMENTS

| 6,392,390 | B1 * | 5/2002 | Ito et al. ........................ 323/209 |
| 6,493,203 | B1 | 12/2002 | Ito et al. |
| 7,095,139 | B2 * | 8/2006 | Tsutada et al. ................ 307/129 |
| 7,696,648 | B2 * | 4/2010 | Kinoshita et al. ............. 307/125 |
| 7,982,341 | B2 * | 7/2011 | Kinoshita et al. ............. 307/115 |
| 2010/0085668 | A1 * | 4/2010 | Kinoshita et al. .............. 361/35 |
| 2010/0141235 | A1 | 6/2010 | Koshiduka et al. |

FOREIGN PATENT DOCUMENTS

| CN | 1308354 A | 8/2001 |
| JP | 2002-75145 | 3/2002 |
| JP | 2004-208394 | 7/2004 |
| WO | WO 2008/065757 A1 | 6/2008 |

OTHER PUBLICATIONS

John H. Brunke et al., "Elimination of Transformer Inrush Currents by Controlled Switching-Part I: Theoretical Considerations", IEEE Transactions on Power Delivery, vol. 16, No. 2, Apr. 2001, 5 pages.

* cited by examiner

*Primary Examiner* — Hal Kaplan
(74) *Attorney, Agent, or Firm* — Oblon, Spivak, McClelland, Maier & Neustadt, L.L.P.

(57) ABSTRACT

A first calculation part calculates the phase-to-phase steady-state magnetic flux of the three phases of the power supply. A second calculation part calculates the phase-to-phase residual magnetic flux of the three phases in the primary windings side of the transformer when the circuit breakers interrupt the transformer. A phase detection part detects a voltage phase at which polarity and magnitude of the calculated steady-state magnetic flux and residual magnetic flux coincide. Closing control part firstly causes only the circuit breakers of the two phases to close at the detected voltage phase, and then causes the circuit breaker of the remaining one phase to close.

11 Claims, 10 Drawing Sheets

(a) Phase sequence relation on Y side and Δ side is +30°

(b) Phase sequence relation on Y side and Δ side is −30°

MAGNETIZING INRUSH CURRENT SUPPRESSION DEVICE FOR TRANSFORMER AND CONTROL METHOD OF SAME

TECHNICAL FIELD

This invention relates to a magnetizing inrush current suppression technique for suppressing the magnetizing inrush current which occurs when a power supply is input to a transformer, especially to a magnetizing inrush current suppression device for transformer and control method of same, which accurately calculate the residual magnetic flux and enable suppression of the magnetizing inrush current without providing a circuit breaker with a resistor or other equipment.

BACKGROUND ART

When no-load energizing is performed by supplying power to a transformer in a state in which there is residual magnetic flux in the transformer core, a large magnetizing inrush current may flow. Generally, the magnitude of this magnetizing inrush current can be greater than or equal to several times the rated load current of the transformer. Therefore, such a magnetizing inrush current flows, resulting in that the system voltage fluctuates, and when this voltage fluctuation is large, consumers can be affected.

Accordingly, as a method of the prior art for suppressing magnetizing inrush currents, for example, a magnetizing inrush current suppression method is proposed in which a circuit breaker with a resistor, formed by connecting in series an closing resistor and a contact, is connected in parallel with one of two main circuit breaker arranged side by side, and power is turned on to this circuit breaker with a resistor in advance of main contact of the two main circuit breaker (see Patent Document 1).

Further, a method is known in which, when a three-phase transformer of a solidly earthed system is supplied with power using three single-phase circuit breakers, one arbitrary phase is supplied with power in advance, and thereafter the remaining two phases are supplied with power, to suppress magnetizing inrush currents (see Non-patent Document 1).

Patent Document 1: Japanese Patent Application Laid-open No. 2002-75145, "Gas Circuit Breaker with Device for Suppression of Magnetizing Inrush Currents"

Patent Document 2: Japanese Patent No. 3,804,606

Non-patent Document 1: IEEE Trans., Vol. 16, No. 2, 2001, "Elimination of Transformer Inrush Currents by Controlled Switching-Part I: Theoretical Considerations"

In the case of the magnetizing inrush current suppression method disclosed in the above-described Patent Document 1 employing a circuit breaker with a resistor, which is formed by connecting in series an closing resistor and a contact, because it is necessary to specially add a circuit breaker with a resistor to the ordinary circuit breaker, in terms of the circuit breaker as a whole, larger equipment size is undeniable.

Moreover, the magnetizing inrush current suppression method in the above-described Non-patent Document 1 in which a transformer of an effectively grounded system is supplied with power by single-phase type, namely, single-phase circuit breakers, has a drawback that it is impossible to suppress the magnetizing inrush current which occurs to a transformer of a non-solidly earthed system. Specifically, when single-phase circuit breakers supply power to energize a no-load transformer installed in a non-solidly earthed system, because closing of one-phase circuit breaker can not apply voltage to transformer windings, closing of the second and third phases follows the same condition as three-phase simultaneous closing, resulting in that it is impossible to suppress the magnetizing inrush current.

Further, it is essential that, when suppressing magnetizing inrush currents at the time of supplying power of transformer, the magnitude of the residual magnetic flux when the transformer is interrupt be ascertained, from a relation with magnetic saturation of the transformer core. However, as described above, when single-phase circuit breakers supply power to energize a no-load transformer installed in a non-solidly earthed system, if the circuit breakers interrupt at the zero point the magnetizing current flowing in the no-load transformer, after interrupting the first phase a zero-phase voltage appears, and after interrupting the second and third phases the zero-phase voltage becomes a DC voltage and remains on the transformer.

Consequently when the voltage to ground at each of the transformer terminals on the side interrupted by the circuit breakers is being measured, the above-described DC voltage is measured after interrupt. Therefore, the residual magnetic flux in the transformer core can not be accurately calculated by integration of the voltage to ground of each terminal.

For example, FIG. 3 shows a phenomenon that, when a transformer in a non-solidly earthed system is interrupted, a DC voltage occurs in the primary terminal voltage. Especially, FIG. 3 (*b*) and (*c*) show the transformer primary voltage to ground and the magnetic flux calculated by integrating the voltage to ground when circuit breakers interrupt the transformer the primary side of which is a Y connection and a neutral point is non-grounded. Further, as shown in FIG. 3 (*b*), after the circuit breakers interrupt the current, a DC voltage occurs in the transformer primary voltage to ground. The voltage of the Y-connected neutral point is also the same.

Here, if the residual magnetic flux is calculated by integrating the transformer terminal voltages 4 to 6, because the occurred DC voltage is to be calculated, as shown in FIG. 3 (*c*), the residual magnetic fluxes 33 to 35 of each phase increase as time passes, and finally diverge. In other words, when the magnetic fluxes are calculated by integrating the transformer terminal voltages 4 to 6, the residual magnetic flux can not be accurately calculated.

DISCLOSURE OF THE INVENTION

This invention was proposed in order to solve the above-described problems, and has as an object the provision of a magnetizing inrush current suppression device for transformer and control method of same, which accurately calculates the residual magnetic flux when a transformer installed in an electric power system, more particularly installed in a non-solidly earthed system, is interrupted by circuit breakers, and which enables suppression of the magnetizing inrush current occurring when three single-phase circuit breakers or single-phase circuit breakers are used for simultaneously supplying power to three phases of the transformer, without providing a circuit breaker with a resistor or other equipment to enlarge the circuit breaker.

In order to attain the above object, the invention provides a magnetizing inrush current suppression device for transformer, to suppress a magnetizing inrush current occurring at the start of energizing of a three-phase transformer the primary windings of which are connected in a Y connection or Δ connection and the secondary windings or tertiary windings of which are Δ-connected, when each of three-phase power supplies are input to each phase of the three-phase transformer by means of each of three-phase circuit breakers, the device having: steady-state magnetic flux calculation means for calculating the line-to-line steady-state magnetic flux of the three-phase power supplies; residual magnetic flux calculation means for calculating the primary line-to-line residual magnetic flux of the transformer when the circuit breakers interrupt the transformer; phase detection means for inputting the steady-state magnetic flux calculated by the steady-state magnetic flux calculation means and the residual magnetic flux calculated by the residual magnetic flux calculation means to detect a phase at which the polarity and magnitude of the magnetic fluxes coincide for each line-to-line; and closing control means for firstly causing only two-phase of the circuit breakers, which are connected with the line-to-line where the polarity and magnitude of the magnetic fluxes coincide, to close at a phase detected by the phase detection means, and then causing the remaining one-phase circuit breaker to close.

As an aspect of the invention, the steady-state magnetic flux calculation means, converts the respective phase voltages of the three-phase power supplies into line-to-line voltages, and integrates the line-to-line voltages to calculate the line-to-line steady-state magnetic flux, or, directly measures respective line-to-line voltages of the three-phase power supplies, and integrates the line-to-line voltages to calculate the line-to-line steady-state magnetic flux.

Further, the invention also provides a magnetizing inrush current suppression device for transformer, to suppress a magnetizing inrush current occurring at the start of energizing of a three-phase transformer the primary windings of which are connected in a Y connection or Δ connection and the secondary windings or tertiary windings of which are Δ-connected, when each of three-phase power supplies are input to each phase of the three-phase transformer by means of each of three-phase circuit breakers, the device having: steady-state magnetic flux calculation means for calculating the line-to-line steady-state magnetic flux of the three-phase power supplies; residual magnetic flux calculation means for calculating any line-to-line residual magnetic flux of the primary, secondary or tertiary side of the transformer when the circuit breakers interrupt the transformer; command means for performing opening command for the circuit breakers; opening phase control means for controlling the opening phase of the circuit breakers into a regular interval by command from the command means;

opening output means for causing the circuit breaker to open at an opening phase of the regular interval controlled by the opening phase control means; measuring and holding means for measuring and holding the relation between the opening phase of the circuit breaker, which has opened through the opening output means, and the line-to-line residual magnetic flux calculated by the residual magnetic flux calculation means at the time of the opening; phase detection means, in the line-to-line the residual magnetic flux of which is held by the measuring and holding means and a predetermined value, for detecting a phase at which the polarity and magnitude of the steady-state magnetic flux and residual magnetic flux of the line-to-line coincide; and closing control means for firstly causing only two-phase of the circuit breakers, which are connected with the line-to-line where the polarity and magnitude of the magnetic fluxes coincide, to close at a phase detected by the phase detection means, and then causing the remaining one-phase circuit breaker to close.

As a result of applying this invention, a magnetizing inrush current suppression device for transformer and control method of same can be provided such that it is possible to suppress the magnetizing inrush current occurring when three single-phase circuit breakers or single-phase circuit breakers are used for simultaneously supplying power to three phases of the transformer, without providing a circuit breaker with a resistor or other equipment to enlarge the circuit breaker.

Figure 1:
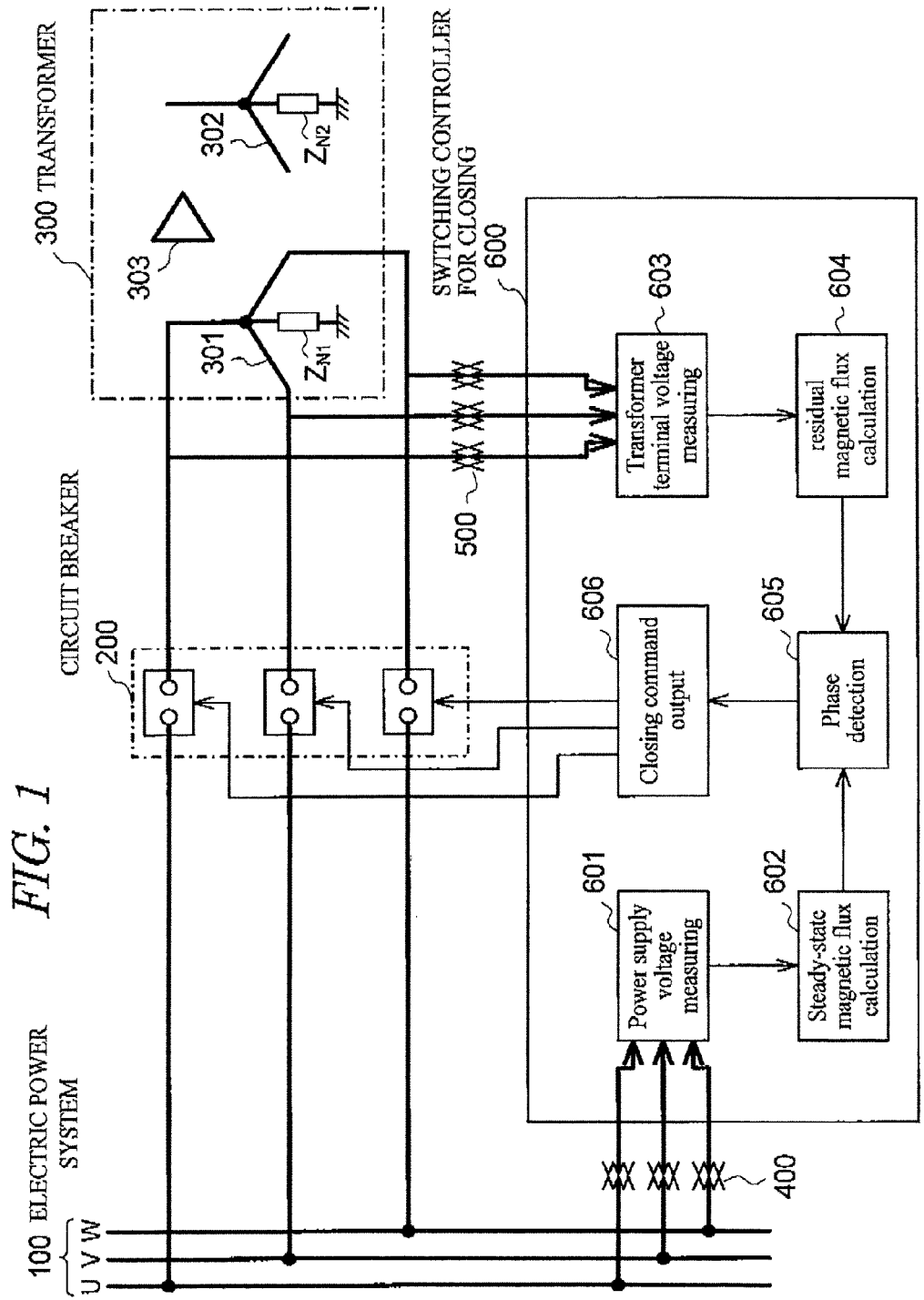
FIG. 1 is a block diagram showing the connection relation between a three-phase transformer, three-phase circuit breakers, and a switching controller for closing in the first embodiment of the invention.

EXPLANATION OF SYMBOLS 1 to 3 Voltage across circuit breakers (U phase, V phase, W phase)
4 to 6 Power supply phase voltages (U phase, V phase, W phase)
7 to 9 Phase-to-phase voltages (UV, VW, WU)
10 to 12 Steady-state magnetic flux obtained by integrating the phase-to-phase voltage (UV, VW, WU)

13 to 15 Phase-to-phase residual magnetic flux (UV, VW, WU)
20 Closing target of two-phase circuit breakers
21 Dispersion of closing target caused by pre-arcing and dispersion of action
22 Pre-arcing electric discharge voltage
23 Dispersion of pre-arcing electric discharge voltage
25 Neutral point voltage
30 to 32 Each transformer phase magnetic flux (U phase, V phase, W phase)
33 to 35 Each transformer phase residual flux (U phase, V phase, W phase)
37 to 39 Each transformer phase magnetizing current (U phase, V phase, W phase)
40 Closing target point of the remaining one-phase circuit breaker
41 V phase voltage when U phase of the circuit breaker 200 closes at the point 20
42 W phase voltage when U phase of the circuit breaker 200 closes at the point 20
50 Closing target region when pre-arcing is under consideration
51 Inappropriate region for closing of the circuit breaker which includes an intersection point of steady-state magnetic flux with residual magnetic flux
52 Voltage across circuit breaker
53 Steady-state magnetic flux
54 Residual magnetic flux
60 to 62 Transformer side phase-to-phase voltages (UV, VW, WU)
63 to 65 Transformer n side each phase voltages (U phase, V phase, W phase)
70 to 72 Phase-to-phase residual magnetic flux depending on opening phase (UV, VW, WU)
100 Electric power system (power supply busbar)
200 Circuit breaker
300 Three-phase transformer
301 Primary windings
302 Secondary windings
303 Tertiary windings
350 Electrostatic capacity
400 Power supply voltage measuring device
500 Transformer terminal voltage measuring device
500A Detachable transformer terminal voltage measuring device
600 Switching controller for closing
600A Switching controller for closing/opening
601 Power supply voltage measuring means
602 Steady-state magnetic flux calculation means
603 Transformer terminal voltage measuring means
604 Residual magnetic flux calculation means
605 Phase detection means
606 Closing command control means
607 Opening phase-residual magnetic flux relation measuring and holding means
608 Opening phase control means
609 Opening command output means

BEST MODE FOR CARRYING OUT THE INVENTION

First Embodiment

Figure 2:
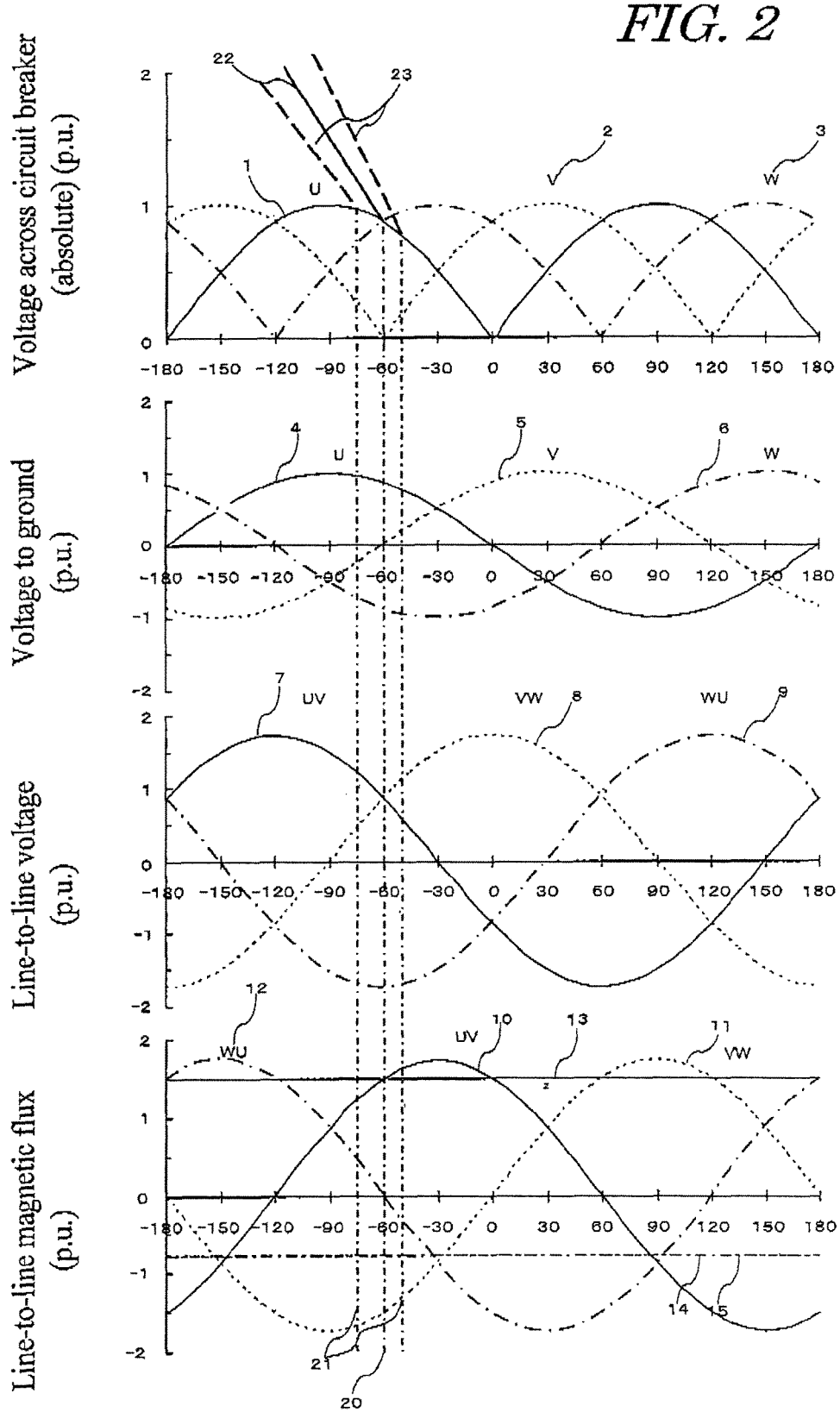
FIG. 2 is a waveform diagram showing the relation between the three-phase power supply phase voltages, phase-to-phase voltages, phase-to-phase steady-state magnetic fluxes, phase-to-phase e residual magnetic fluxes, voltage across circuit breakers and closing target of two-phase circuit breakers in the first embodiment of the invention.

Next, the configuration, operation and effect of a magnetizing inrush current suppression device for transformer as a first embodiment of the invention is explained below referring to FIG. 1 to FIG. 5. Here, FIG. 1 is a block diagram showing the connection relation between a three-phase transformer, three-phase circuit breakers, and a switching controller for closing which performs closing command to the main contact of each circuit breaker. FIG. 2 is a waveform diagram showing the relation between the voltage across circuit breakers for supplying power to the transformer, power supply phase voltages, phase-to-phase voltages, phase-to-phase steady-state magnetic fluxes, and phase-to-phase residual magnetic fluxes.

Figure 3:
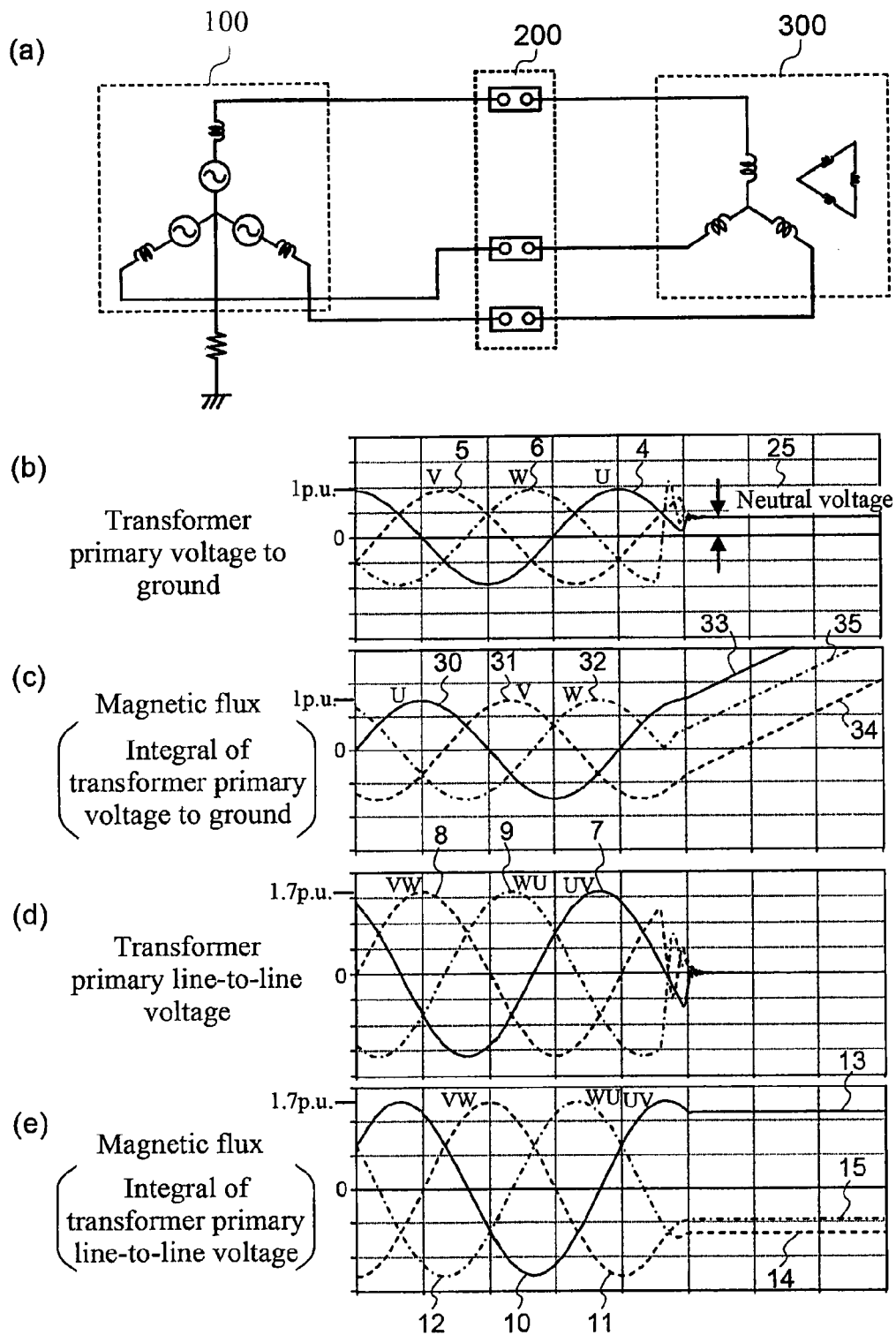
FIG. 3 (a) is a connection diagram showing a three-phase transformer in a non-solidly earthed system, and FIG. 3 (b) to (e) are waveform diagrams showing a phenomenon that after the circuit breakers interrupt the three-phase transformer, a DC voltage occurs in the transformer neutral point, and the magnetic fluxes diverge by integrating the transformer terminal voltage in the first embodiment of the invention and prior art.
Figure 4:
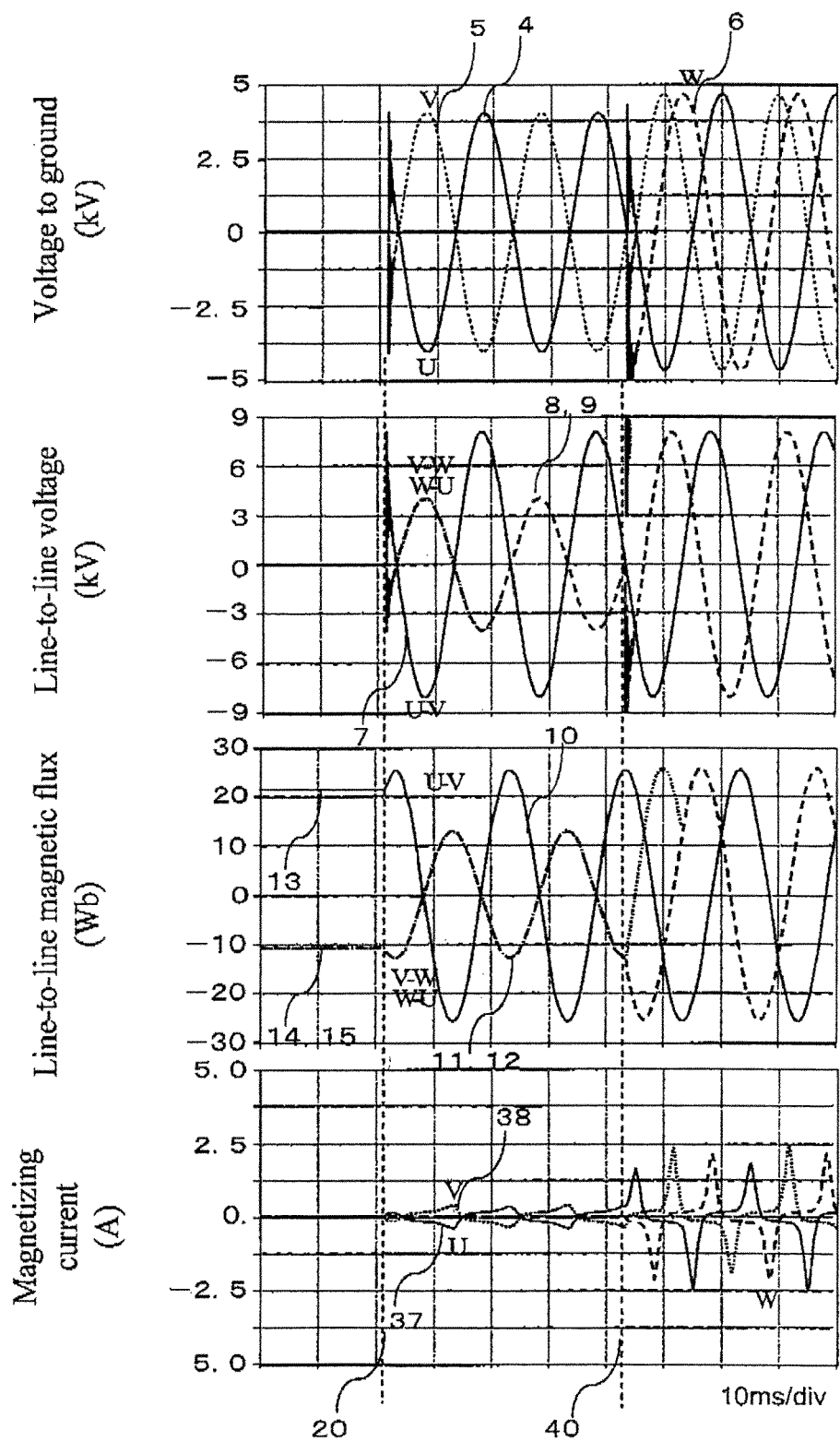
FIG. 4 is a waveform diagram showing suppression effect of the magnetizing inrush current in the first embodiment of the invention.
Figure 5:
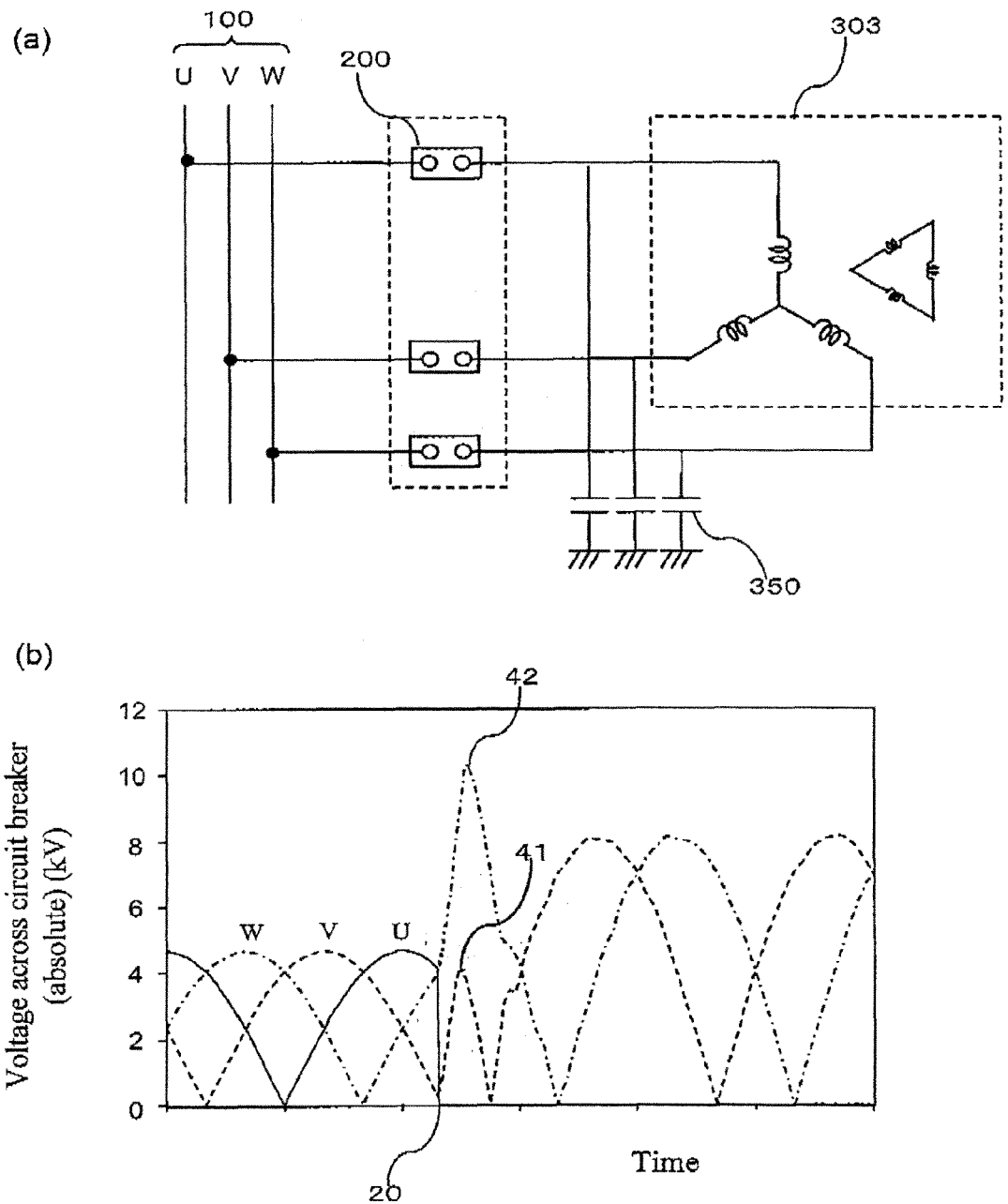
FIG. 5 (a) is a connection diagram showing a three-phase transformer in a non-solidly earthed system, and FIG. 5 (b) is a waveform diagram illustrating, when one-phase circuit breaker is caused to close, voltage variation of the other phase circuit breakers in supplying power to the three-phase transformer in the first embodiment of the invention.

Further, FIG. 3 is a figure showing a phenomenon that, when a transformer in a non-solidly earthed system is interrupted, a DC voltage occurs in the primary terminal voltage. FIG. 4 is a waveform diagram showing variation of transformer primary terminal voltages, phase-to-phase voltages, phase-to-phase magnetic flux, and transformer magnetizing current when a 3.3 kV-415 V-300 kVA transformer has Y-Δ connections, with simulating the conditions of non-solidly earthed system, U phase and V phase circuit breakers 200 are closed at closing target 20, after that, the remaining W phase circuit breaker 200 is closed at closing target 40. FIG. 5 is a waveform diagram showing, when only one-phase circuit breaker is caused to close, voltage across circuit breaker variation of the remaining two phase circuit breakers in supplying power to the three-phase transformer in a non-solidly earthed system.

[Configuration]

In FIG. 1, 100 is a busbar of the electric power system (also called a power supply busbar), and 200 a circuit breaker provided in each of three phases. 300 is a three-phase transformer, to which the power supply busbar 100 is input or interrupted by the three-phase circuit breakers 200, as an example, the primary windings 301 and secondary windings 302 are Y-connected, and the tertiary windings 303 are Δ-connected. Zn1 and Zn2 are respectively impedances to ground the neutral points of the primary windings 301 and secondary windings 302.

400 is a power supply voltage measuring device, comprising a voltage transformer VT or similar, to measure the voltages of respective phases (U, V, W) of the power supply busbar 100. 500 is a transformer terminal voltage measuring device, comprising a VT or similar, to measure the terminal voltages of each primary-side phase (U, V, W) of the three-phase transformer 300. 600 is a switching controller for closing which outputs a closing command to the main contacts of the circuit breakers 200, for example, which is embodied by a digital arithmetic and control unit having a CPU.

In the switching controller for closing 600, 601 is power supply voltage measuring means for capturing and measuring the power supply voltages of respective phases (phases U, V, W) output from the VT or other power supply voltage measuring device 400. 602 is steady-state magnetic flux calculation means for calculating each phase-to-phase steady-state magnetic flux, by converting each of the phase voltages measured by the power supply voltage measuring means 601 into phase-to-phase voltage, and integrating the phase-to-phase voltage.

603 is transformer terminal voltage measuring means for capturing and measuring the transformer terminal voltages for respective phases (phases U, V, W) output from the transformer terminal voltage measuring device (VT) 500. 604 is residual magnetic flux calculation means for calculating each phase-to-phase residual magnetic flux, by converting each of the phase voltages measured by the transformer terminal voltage measuring means 603 into phase-to-phase voltage, and integrating the phase-to-phase voltage.

605 is phase detection means for taking input, for each phase-to-phase (UV, VW, WU), of the output signals of the steady-state magnetic flux calculation means 602 and the output signals of the residual magnetic flux calculation means 604, and for detecting phases at which the phase-to-phase steady-state magnetic flux and residual magnetic flux have the same polarity and magnitude. Further, the phase detection means 605, when two-phase circuit breakers 200 have been closed prior to the other phase by the closing command control means 606 described later, detects a phase of a time point at which the two-phase phase-to-phase voltages become zero simultaneously.

606 is closing command output means for taking input, for three phases, of the output signals from the phase detection means 605, and for outputting a closing command to the operation mechanism driving the main contacts of the circuit breakers 200 such that two-phase circuit breakers 200 are closed prior to the remaining one-phase and closing of the remaining one-phase is delayed.

[Action]

Next, an example of action of the first embodiment having the above-described configuration is explained below referring to FIG. 2. In FIGS. 2, 4 to 6 are power supply voltages for respective phases (phases U, V, W). The phase voltages 4 to 6 are measured by the power supply voltage measuring means 601. 7 to 9 are phase-to-phase voltages obtained by converting the phase voltages 4 to 6 for respective phases. 10 to 12 are the steady-state magnetic flux for each phase-to-phase voltage calculated by integrating each of the phase-to-phase voltages 7 to 9.

Further, 13 to 15 plotted by invariable straight line are the residual magnetic fluxes between the respective phases (UV, VW, WU) of the primary-side of the three-phase transformer 300 calculated by the residual magnetic flux calculation means 604. The example of FIG. 2 shows a state in which the transformer UV residual magnetic flux 13 is of positive polarity and the maximum value, and the VW and WU residual magnetic fluxes 14 and 15 are of negative polarity and the same value (half of the residual magnetic flux 13)

Firstly, the power supply voltage measuring means 601 measures the phase voltages 4 to 6 for respective phases of the power supply busbar 100 through the power supply voltage measuring device 400, and the steady-state magnetic flux calculation means 602 converts each of the phase voltages 4 to 6 into each of the phase-to-phase voltages 7 to 9, and integrates the phase-to-phase voltages 7 to 9 to calculate the UV, VW, and WU phase-to-phase steady-state magnetic fluxes 10 to 12. Alternatively, a method can be performed in which the phase voltages 4 to 6 are integrated to calculate the steady-state magnetic fluxes for respective phases, and the calculated steady-state magnetic fluxes of respective phases are converted into the phase-to-phase steady-state magnetic fluxes 10 to 12.

The transformer terminal voltage measuring means 603 measures the transformer terminal voltages for respective phases (phases U, V, W) of the primary-side through the transformer terminal voltage measuring device 500, and the residual magnetic flux calculation means 604 converts each of the phase voltages measured by the transformer terminal voltage measuring means 603 into each of the UV, VW, and WU phase-to-phase voltages, and integrates the phase-to-phase voltages to calculate the UV, VW, and WU phase-to-phase residual magnetic fluxes 13 to 15. Alternatively, a method can be performed in which the respective phase voltages measured by the transformer terminal voltage measuring means 603 are integrated to calculate the residual magnetic fluxes for respective phases, and the calculated residual magnetic flux of respective phases are converted into the phase-to-phase residual magnetic fluxes 13 to 15.

The phase detection means 605 receives, for each phase-to-phase, the output signals of the steady-state magnetic flux calculation means 602 and the output signals of the residual magnetic flux calculation means 604, and detects phases at which the obtained steady-state magnetic flux and primary phase-to-phase residual magnetic flux of the transformer 300 have the same polarity and magnitude. In FIG. 2, in the case of the UV phase-to-phase voltage in which the phase-to-phase residual magnetic flux is the maximum value, because the intersection point of the phase-to-phase steady-state magnetic flux 10 with the phase-to-phase residual magnetic flux 13 is the point 20, the phase detection means 605 detects the point 20.

Further, the phase detection means 605, when two-phase circuit breakers 200 have been closed prior to the other phase by the closing command control means 606, detects a phase of a time point at which the two-phase phase-to-phase voltages become zero simultaneously. In other words, in the case of FIG. 4, the phase of the point 40 is detected, at which the U phase and V phase phase-to-phase voltages of the circuit breakers 200 become zero simultaneously.

The closing command control means 606, at the phase at which the phase-to-phase steady-state magnetic flux and residual magnetic flux have the same polarity and magnitude, closes the two-phase circuit breakers 200 connected with the phase-to-phase prior to the other phase. In other words, the closing command control means 606 causes the U phase and V phase the circuit breakers 200 to close simultaneously both the two phases at the point 20. And then the closing command control means 606 causes the remaining one-phase or W phase circuit breaker 200 to close at the point 40.

[Advantageous Effect]

(a) The above-described first embodiment is different from prior art in which a DC voltage occurs in the transformer primary voltage to ground after the circuit breakers has interrupted the current, and the residual magnetic flux calculated by integrating the transformer primary voltage diverges, affected by this, the residual magnetic flux can not be accurately calculated. In other words, as a result of applying the first embodiment, the residual magnetic flux can be accurately calculated without being affected by the DC voltage, and thereby without divergence of the magnetic flux. Specifically, as shown in FIG. 3 (*d*) and (*e*), in the first embodiment, the voltage to ground is not directly integrated to calculate the residual magnetic flux, but the phase-to-phase voltage calculated from the voltage to ground, the calculated phase-to-phase voltage is integrated to calculate the residual magnetic flux. Alternatively, even if the voltage to ground is integrated to calculate the residual magnetic flux, ultimately the residual magnetic flux is calculated from the residual magnetic flux obtained by integration.

For more detailed explanation, as is clear from the DC voltage 25 of FIG. 3 (*b*), after interrupt by the circuit breakers, the transformer primary voltages to ground for respective phases are DC voltages having the same magnitude. Here, for example, UV phase-to-phase voltage is obtained by subtracting the V phase voltage to ground from the U phase voltage to ground, the phase-to-phase voltages 7 to 9 are calculated from the differences of the primary voltages to ground, therefore, the effect of the DC voltage as described above does not appear in the phase-to-phase voltages 7 to 9. In other words, by integrating the phase-to-phase voltages in which the effect of the DC voltage does not appear, the residual magnetic fluxes 13 to 15 can be calculated such that the magnetic fluxes do not diverge.

Consequently, as a result of applying the first embodiment, if the phase-to-phase voltages are integrated to determine the relation between steady-state magnetic flux and residual magnetic flux, without being affected by the DC voltage occurring after the transformer has been interrupted, namely, a neutral point voltage, the phase, at which the phase-to-phase steady-state magnetic flux and residual magnetic flux have the same polarity, and at which the subsequent closing of circuit breakers 200 is performed, can be accurately determined.

In FIG. 3, a state is shown in which there is no transformer neutral point impedance. However, in a non-solidly earthed system, there are cases in which an impedance such as a resistance of large value is connected to the transformer neutral point, and in this case also a DC voltage appears at the transformer neutral point. Therefore, as a result of applying the first embodiment described above, by means of integrating the line-to-line voltages to determine the relation between steady-state magnetic flux and residual magnetic flux, the closing phase, at which the circuit breakers 200 are closed, can be accurately determined, without being affected by the neutral point voltage.

(b) The first embodiment, which has effects described above, enables suppression of a large magnetizing inrush current as shown in FIG. 4. As described above, FIG. 4 is a waveform diagram showing variation of transformer primary terminal voltages, phase-to-phase voltages, phase-to-phase magnetic flux, and transformer magnetizing current when a 3.3 kV-415 V-300 kVA transformer has Y-Δ connections, with simulating the conditions of non-solidly earthed system, U phase and V phase circuit breakers 200 are closed at closing target 20, after that, the remaining W phase circuit breaker 200 is closed at closing target 40. In FIG. 4, the phase-to-phase residual magnetic fluxes are the same as those of FIG. 2. In other words, FIG. 4 shows a state in which the UV residual magnetic flux is of positive polarity and the maximum value, and the VW and WU residual magnetic fluxes are of negative polarity and half of the UV residual magnetic flux.

In FIG. 4, after the U phase and V phase circuit breakers 200 have been caused to close simultaneously at the point 20 which is a closing target, a very little magnetizing currents 37 and 38 flow in the transformer 300. In other words, only the U phase and V phase magnetizing currents flows, while the W phase magnetizing current does not flow. Subsequently, when the remaining W phase circuit breaker 200 is caused to close at the point 40, in the W phase also a magnetizing current 39 flows.

Specifically, after the U phase and V phase of circuit breakers 200 have been caused to close simultaneously both the two phases at the closing target 20, a voltage of the phase-to-phase voltage √3e is applied between the U phase and V phase terminals of the transformer 300. In other words, because a voltage is not applied to the W phase, a voltage of √3e/2 is applied to the transformer U phase windings and V phase windings. This is also shown waveforms 4 and 5 of voltages to ground which are shown in FIG. 3.

Therefore, as shown in FIG. 4, a magnetizing current between the points 20 and 40 is small, and after the point 40, three-phase voltages are applied, but a magnetizing current is 2.5 A level at a maximum, the magnetizing inrush current can be greatly suppressed.

(c) In the above-described FIG. 2, which is a waveform diagram showing the relation between the voltage across circuit breaker 1 of the U phase circuit breaker 200 for supplying power to the transformer 300, power supply phase voltages, phase-to-phase voltages, phase-to-phase steady-state magnetic fluxes, and phase-to-phase residual magnetic fluxes, the voltage across circuit breaker 1 of the U phase circuit breaker 200 shows a high voltage in the vicinity of the peak value the point 20 which is a closing target. However, the voltage across circuit breaker 2 of the V phase circuit breaker 200 shows nearly zero, and this causes the fear that the closing time of the V phase is delayed compared with the U phase, and the two-phase circuit breakers 200 can not be caused to close simultaneously.

Here, in FIG. 5, under the condition that when a 3.3 kV-415 V-300 kVA transformer has Y-E connections, is a waveform diagram showing, when the circuit breaker 200 of only one phase changes into a closing state, voltage variation of the other phases. If the U phase circuit breaker 200 has been caused to close, voltage across circuit breakers of the other phases rise rapidly accompanying transient oscillations, as can be seen from the V phase voltage 41 across circuit breaker and W phase voltage 42 across circuit breaker.

In the case of the first embodiment as shown in FIG. 2, after only one-phase circuit breaker 200 has been caused to close at the point 20, the voltage across circuit breakers of the other phases rise rapidly accompanying transient oscillations. This is caused by that charging of stray capacitance 350 across the unclosed phase terminals of the transformer and the circuit breaker 200 due to the voltage of the closed phase. After convergence of the transient oscillations, the voltage across circuit breakers of respective phases are of magnitude √3 per unit (p.u.).

Thus it is understood that, when at the closing target point 20 in FIG. 2 the two-phase circuit breakers 200 are caused to close, after the electrical closing state which follows advance discharge caused by closing of one-phase circuit breaker, the other phase also immediately enters the closing state due to advance discharge, and the time difference in closing for the two-phases of the circuit breakers 200 can be made smaller.

In FIG. 2, 22 denotes the pre-arcing voltage which is the voltage of the above-described advance discharge during closing of the circuit breaker 200. As described above, when the circuit breaker is closed in the state in which voltages are applied across the circuit breaker electrodes, prior to mechanical contact of the circuit breaker contacts, advance discharge called pre-arcing occurs, resulting in an electrically closed state. The voltage at which pre-arcing occurs is larger for larger distances between contacts of the circuit breaker 200. Hence as shown in FIG. 2, the pre-arcing voltage 22 decreases along the time axis.

[Other Embodiment Relevant to First Embodiment]

In the above-described first embodiment, the steady-state magnetic flux calculation means 602 calculates each phase-to-phase steady-state magnetic flux, by converting each of the phase voltages measured by the power supply voltage measuring means 601 into phase-to-phase voltage, and integrating the voltage. However, the invention includes an embodiment in which the respective phase voltages measured by the power supply voltage measuring means 601 are integrated to calculate the steady-state magnetic fluxes of respective phases, and the steady-state magnetic fluxes of respective phases are converted into phase-to-phase steady-state magnetic fluxes. Further, the power supply voltage measuring device 400 such as VT often has a function that converts voltages to ground into phase-to-phase voltages within the device, in this case, it is unnecessary to convert voltages to ground into phase-to-phase voltages through the steady-state magnetic flux calculation means 602.

In the above-described first embodiment, the residual magnetic flux calculation means 604 calculates each phase-to-phase residual magnetic flux, by converting each of the phase voltages measured by the transformer terminal voltage measuring means 603 into phase-to-phase voltage, and integrating the phase-to-phase voltage. However, the invention includes an embodiment in which each of the phase voltages measured by the transformer terminal voltage measuring means 603 is integrated to calculate the residual magnetic flux of each terminal of the transformer 300, and the residual magnetic flux of each terminal is converted into phase-to-phase residual magnetic flux. Further, if the transformer terminal voltage measuring device 500 such as VT has a function that converts a voltage to ground into phase-to-phase voltage within the device, it is unnecessary to convert a voltage to ground into phase-to-phase voltage through the residual magnetic flux calculation means 604.

In the above-described first embodiment, as shown in FIG. 4, it is embodied that the closing point 40 is about 2 cycles after from the advance two-phase closing. However, the invention, for example, includes an embodiment in which the closing point is half cycle after from the advance two-phase closing. The point 40 can be appropriately set in advance by performing in advance an analysis using EMTP and other pieces of software, or, measurement using an actual transformer.

Further, in the pre-arcing voltages shown in FIG. 2 and FIG. 5, generally, dispersion often appears, and when the circuit breaker 200 is to close, dispersion of closing time is caused by dispersion of action of the operation mechanism. Here, in FIG. 2, pre-arcing voltage, which includes the dispersion of the pre-arcing voltage and the dispersion of closing time of the circuit breaker 200, is denoted by 23.

Consequently, by acquiring in advance the characteristics of dispersion as described above, the switching controller for closing 600, which controls the closing phase of the circuit breaker 200, makes a compensation with taking account of the characteristics of dispersion, and then controls the closing phase. The invention includes such embodiment. As shown in FIG. 2, even if the closing point of the circuit breaker 200 has dispersion of pre-arcing voltage as shown by the region 23, the difference between the phase-to-phase steady-state magnetic flux and residual magnetic flux does not become remarkably large, therefore, there is no obstacle to the effect that the embodiment enables suppression of large magnetizing inrush current.

Second Embodiment

Figure 6:
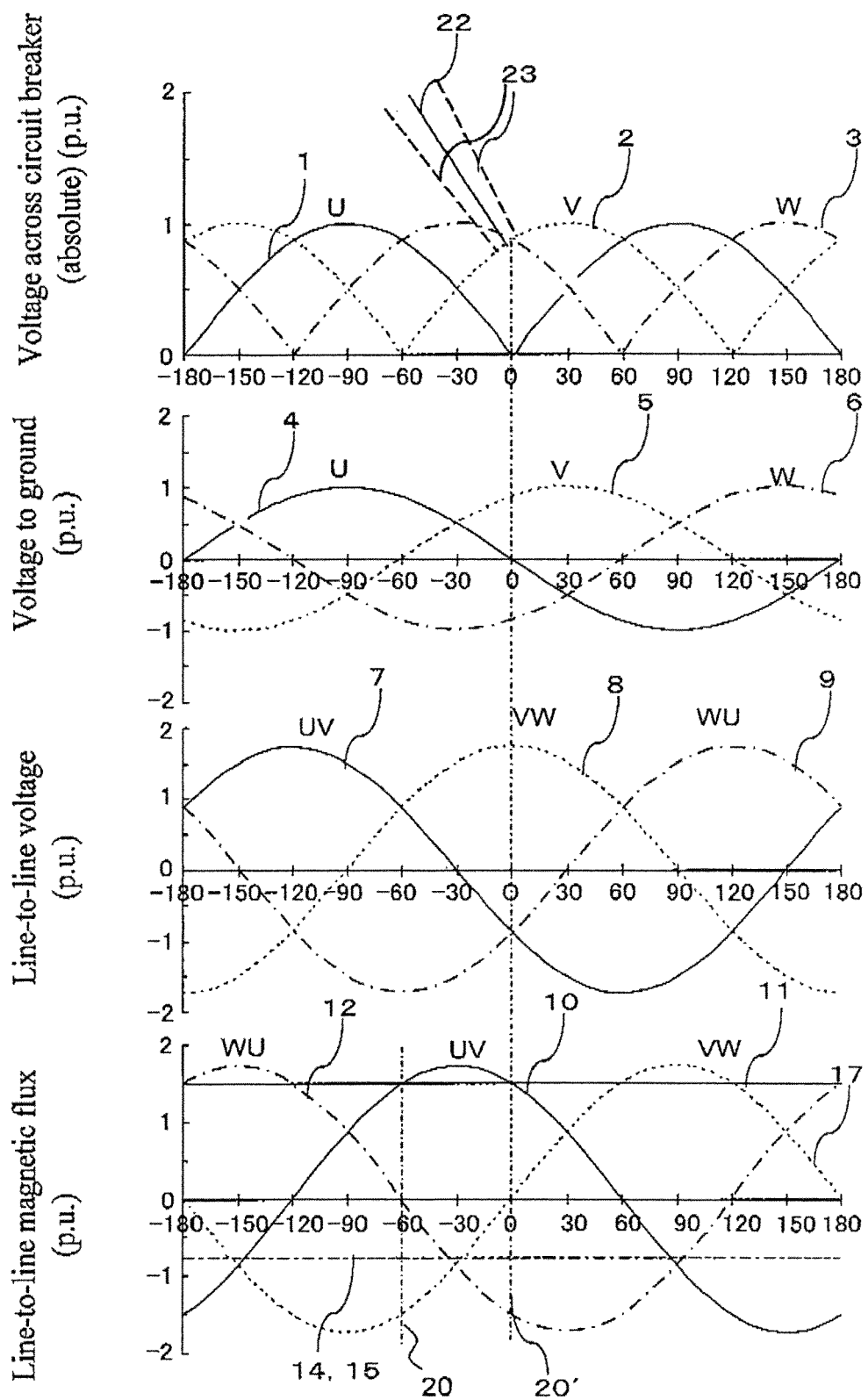
FIG. 6 is a waveform diagram showing the relation between the three-phase power supply phase voltages, phase-to-phase voltages, phase-to-phase steady-state magnetic fluxes, phase-to-phase residual magnetic fluxes, voltage across circuit breakers and closing target of two-phase circuit breakers in the second embodiment of the invention.

Next, a magnetizing inrush current suppression device for transformer as a second embodiment of the invention is explained below referring to FIG. 6. Here, FIG. 6 shows a modification of the waveform diagram of FIG. 2, in which the closing point of the circuit breaker has been changed.

[Configuration]

In the second embodiment, the connection relation between the three-phase transformer 300, three-phase circuit breakers 200, and switching controller for closing 600, is the same as that of the first embodiment, therefore, the second embodiment has a common configuration with the first embodiment except for the following points.

The second embodiment is an embodiment in which the switching controller for closing 600 is set such that the point 20', different from the point 20 in FIG. 2, is set as the target point for closing of the circuit breakers 200 of the two phases. At point 20', between the phases where the residual magnetic flux is the maximum value among the phases of the three-phase transformer 300, the polarity and magnitude of the steady-state magnetic flux and residual magnetic flux coincide.

Specifically, the switching controller for closing 600 is set such that the phase detection means 605, when taking input, for each phase-to-phase (UV, VW, WU), of the output signals of the steady-state magnetic flux calculation means 602 and the output signals of the residual magnetic flux calculation means 604, detects the second phase in time order of all phases at which the phase-to-phase steady-state magnetic flux and residual magnetic flux obtained from the signals have the same polarity and magnitude. Needless to say, the phase to be detected is not limited to the second in time order, another phase can be detected, at which the phase-to-phase steady-state magnetic flux and residual magnetic flux have the same polarity and magnitude.

[Action]

Next, an example of action of the second embodiment having the above-described configuration is explained below.

Firstly, similar to the first embodiment, the power supply voltage measuring means 601 measures the phase voltages 4 to 6 for respective phases through the power supply voltage measuring device 400, and the steady-state magnetic flux calculation means 602 converts each of the phase voltages 4 to 6 into each of the phase-to-phase voltages 7 to 9, and integrates the phase-to-phase voltages 7 to 9 to calculate the phase-to-phase steady-state magnetic fluxes 10 to 12. Alternatively, a method can be performed in which the phase voltages 4 to 6 are integrated to calculate the steady-state magnetic fluxes for respective phases, and the calculated steady-state magnetic fluxes of respective phases are converted into the phase-to-phase steady-state magnetic fluxes 10 to 12.

The transformer terminal voltage measuring means 603 measures the transformer terminal voltages for respective phases (phases U, V, W) through the transformer terminal voltage measuring device 500, and the residual magnetic flux calculation means 604 converts each of the phase voltages measured by the transformer terminal voltage measuring means 603 into each of the phase-to-phase voltages, and integrates the phase-to-phase voltages to calculate the UV, VW, and WU phase-to-phase residual magnetic fluxes 13 to 15. Alternatively, a method can be performed in which the phase voltages measured by the transformer terminal voltage measuring means 603 are integrated to calculate the residual magnetic fluxes for respective phases, and the calculated residual magnetic fluxes of respective phases are converted into the phase-to-phase residual magnetic fluxes 13 to 15.

As a feature of the second embodiment, the phase detection means 605 receives, for each phase-to-phase, the output signals of the steady-state magnetic flux calculation means 602 and the output signals of the residual magnetic flux calculation means 604, and detects the phase of the second point in time order of all points at which the obtained phase-to-phase steady-state magnetic flux and phase-to-phase residual magnetic flux of the transformer 300 have the same polarity and magnitude. In FIG. 6, in the case of the UV phase-to-phase in which the phase-to-phase residual magnetic flux is the maximum value, because the intersection points of the phase-to-phase steady-state magnetic flux 10 with the phase-to-phase residual magnetic flux 13 are the points 20 and 20', the phase detection means 605 detects the point 20' as the second point.

The closing command control means 606, at the phase of the second point in time order of all points at which the phase-to-phase steady-state magnetic flux and residual magnetic flux have the same polarity and magnitude, closes the two-phase circuit breakers 200 prior to the other phase. In other words, in FIG. 6, the closing command control means 606 causes the U phase and V phase the circuit breakers 200 to close simultaneously both the two phases at the point 20'.

Further, the phase detection means 605, when two-phase circuit breakers 200 have been closed prior to the other phase by the closing command control means 606, detects a phase of a time point at which the two-phase phase-to-phase voltages become zero simultaneously. In other words, the phase of the point 40 is detected, at which the U phase and V phase phase-to-phase voltages of the circuit breakers 200 become zero simultaneously. And then the closing command control means 606 causes the remaining one-phase or W phase circuit breaker 200 to close at the point 40.

[Advantageous Effect]

As a result of applying the second embodiment in which the two-phase circuit breakers 200 is closed at the phase of the second point in time order of all points at which the polarity and magnitude of the phase-to-phase steady-state magnetic flux and residual magnetic flux coincide, for the same reason as the first embodiment, a large magnetizing inrush current can be suppressed (not shown in figures).

Further, in the second embodiment, as shown in FIG. 6, for a non-solidly earthed system transformer, the point 20' which is the second intersection point of the two intersection points of the steady-state magnetic flux with residual magnetic flux, can be set as a closing target of the circuit breakers 200. This can improve the degree of freedom in closing target settings.

For example, when a effectively grounded system transformer is to be closed according to the method of Non-patent Document 1 cited as the prior art, one-phase circuit breaker is closed, and then the remaining two-phase circuit breakers are closed. Here, with regard to determination of closing phase for one-phase circuit breaker to be closed prior to the other phase, if taking account of an electric closing due to pre-arcing discharge according to Patent Document 2, as shown in FIG. 7, the region of the closing phase denoted by 50.

Figure 7:
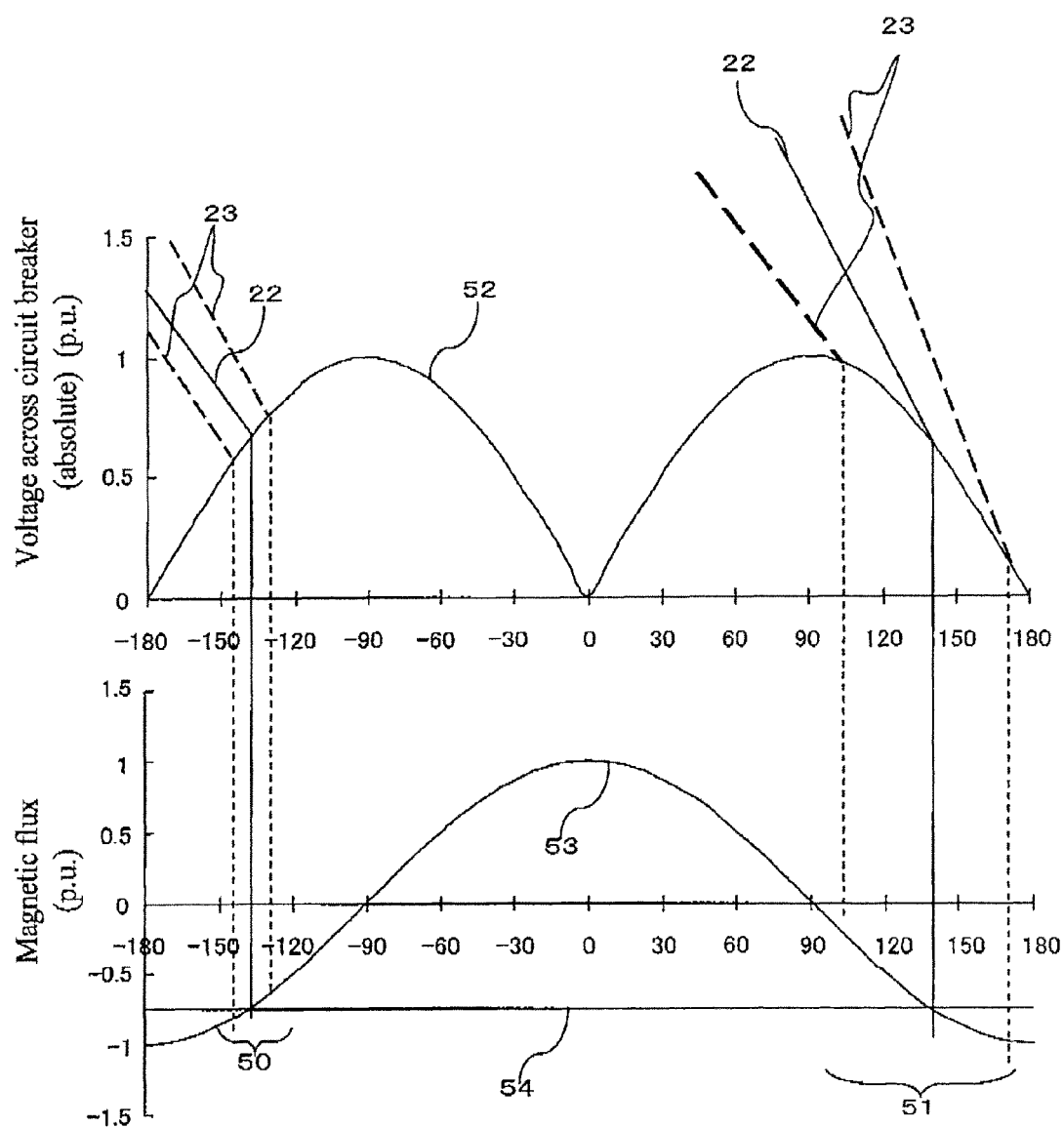
FIG. 7 is an illustrative view of how to determine the phase as a first phase to be closed in the circuit breakers when the transformer of the solidly earthed system of prior art is to be supplied with power.

In FIG. 7, when a transformer the primary windings of which are grounded at neutral points is closed, how to determine the closing phase of the first phase to be closed is explained (see Patent Document 2). In other words, according to Patent Document 2, in the region 50, even if dispersion of pre-arcing or dispersion of action of circuit breakers exist, the difference between steady-state magnetic flux and residual magnetic flux at closing point can be made smaller.

However, as shown in FIG. 7, an intersection point of the steady-state magnetic flux with residual magnetic flux, namely, the point at which the steady-state magnetic flux and residual magnetic flux are of the same polarity and magnitude, also exists in the region 51, it is inappropriate to set the region 51 as a closing target, because, if taking account of the dispersion of pre-arcing or dispersion of action of circuit breakers, the difference between steady-state magnetic flux and residual magnetic flux at closing point is made larger. In other words, if closing is performed with setting the region 51 as a closing target, a large magnetizing inrush current may occur due to the difference between steady-state magnetic flux and residual magnetic flux.

On the other hand, as a result of applying the second embodiment of the invention, as described above, in a non-solidly earthed system, any of the two intersection points of the steady-state magnetic flux with residual magnetic flux, can be set as a closing target, resulting in an improvement of the degree of freedom in closing target settings.

Further, as shown in FIG. 6, in the second embodiment, the UV phase-to-phase steady-state magnetic flux 10 and residual magnetic flux 13 coincide at the point 20 as a closing target of the circuit breakers 200, but at the point 20', the V phase voltage across circuit breaker 2 of the circuit breakers 200 shows a value in the vicinity of the peak value and the U phase voltage across circuit breaker 1 shows nearly zero. However, for the same reason as the first embodiment, in the second embodiment, after the electrical closing state is caused by advance discharge of one-phase circuit breaker, the other phase also immediately enters the electrical closing state due to advance discharge, the two-phases closing of the circuit breakers 200 can be substantially performed.

[Other Embodiment Relevant to Second Embodiment]

In the second embodiment as described above, the phase detection means 605 within the switching controller for closing 600, detects the phase of the second point in time order of all points at which the obtained phase-to-phase steady-state magnetic flux and phase-to-phase residual magnetic flux have the same polarity and magnitude. However, the invention includes the following embodiment.

Specifically, when taking input, for each phase-to-phase (UV, VW, WU), of the output signals of the steady-state magnetic flux calculation means 602 and the output signals of the residual magnetic flux calculation means 604, the phase detection means 605, when it detects phase points at which the phase-to-phase steady-state magnetic flux and residual magnetic flux obtained from the signals have the same polarity and magnitude, detects all phase points or predetermined number of phase points set in advance. The closing command control means 606, from phase points at which the phase-to-phase steady-state magnetic flux and residual magnetic flux have the same polarity and magnitude, selects a desired point, for example, in the case of FIG. 6, the point 20' the second intersection point 20' of the steady-state magnetic flux with residual magnetic flux, and causes the two-phase circuit breakers 200 to close at the selected point.

Third Embodiment

Figure 8:
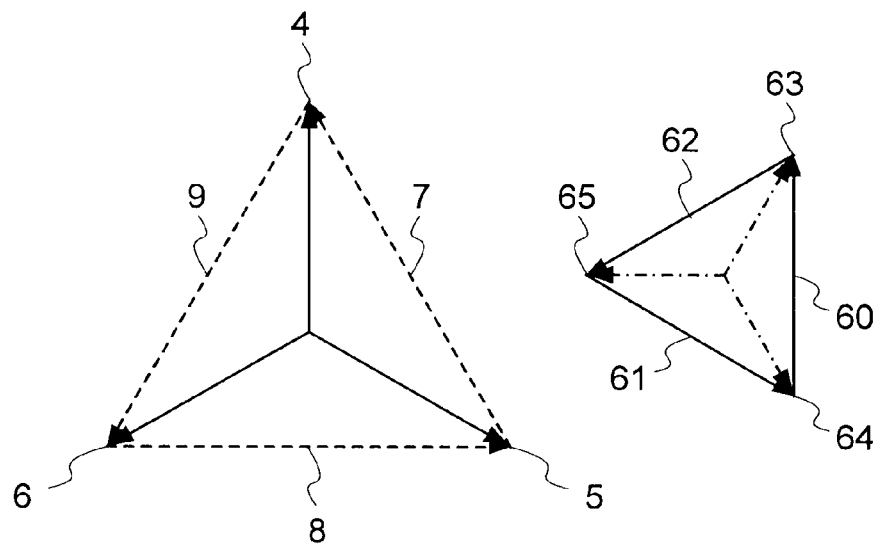
FIG. 8 is a figure showing the relation between the voltages to ground and phase-to-phase voltage of the transformer primary and secondary side in the third embodiment of the invention.
Figure 8:
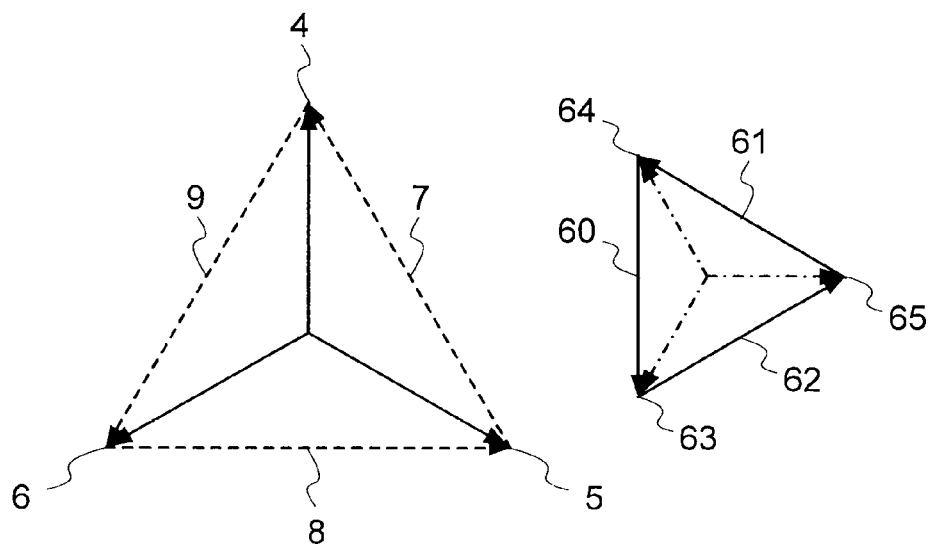

Next, a magnetizing inrush current suppression device for transformer as a third embodiment of the invention is explained below referring to FIG. 8. Here, FIG. 8 shows the phase relations between the primary Y-side phase voltages and phase-to-phase voltages, and the secondary or tertiary Δ-side voltages to ground and phase-to-phase voltages.

[Configuration]

In the third embodiment, the connection relation between the three-phase transformer 300, three-phase circuit breakers 200, and switching controller for closing 600, is the same as that of the first embodiment, therefore, the third embodiment has a common configuration with the first embodiment except for the following points.

The third embodiment is a embodiment in which, even if a voltage division device is not installed on the transformer primary Y side, and the transformer terminal voltage of the primary Y side cannot be measured by the transformer terminal voltage measuring means 603 through the transformer terminal voltage measuring device 500, by measuring the voltages to ground on the secondary or tertiary Δ connection side, the primary Y side phase-to-phase voltages can be calculated.

Specifically, even if a voltage division device is not installed on the transformer primary Y side, for the Δ side voltages to ground which are measured by the transformer terminal voltage measuring means 603, the residual magnetic flux calculation means 604 inverts the polarities of the voltages or leaves them as they are, depending on the phase sequence relation between Y side and Δ side of the transformer 300 to calculate the primary Y side phase-to-phase voltages, and integrates the calculated phase-to-phase voltages to calculate the phase-to-phase residual magnetic flux.

[Action]

Next, an example of action of the third embodiment having the above-described configuration is explained below.

Firstly, similar to the first embodiment, the power supply voltage measuring means 601 measures the phase voltages 4 to 6 for respective phases through the power supply voltage measuring device 400, and the steady-state magnetic flux calculation means 602 converts each of the phase voltages 4 to 6 into each of the phase-to-phase voltages 7 to 9, and integrates the phase-to-phase voltages 7 to 9 to calculate the phase-to-phase steady-state magnetic fluxes 10 to 12. Alternatively, a method can be performed in which the phase voltages 4 to 6 are integrated to calculate the steady-state magnetic fluxes for respective phases, and the calculated steady-state magnetic fluxes of respective phases are converted into the phase-to-phase steady-state magnetic fluxes 10 to 12.

Here, in the third embodiment, the transformer terminal voltage measuring means 603 measures the Δ side voltages to ground through the transformer terminal voltage measuring device 500. The residual magnetic flux calculation means 604 inverts the polarities of the Δ side voltages to ground measured by the transformer terminal voltage measuring means 603 for all three phases, to calculate the primary Y side phase-to-phase voltages.

Specifically, in FIG. 8 (a) in which the phase sequence relation on the Y-side and Δ-side is +30°, for example, the Δ-side W phase voltage to ground 65 is directed opposite to the vector of the primary Y-side VW phase-to-phase voltage 8. The relations are similar between the Δ-side V phase voltage to ground 64 and the Y-side UV phase-to-phase voltage 7, and between the Δ-side U phase voltage to ground 63 and the Y-side WU phase-to-phase voltage 9. In other words, the two vectors of each combination are directed opposite to each other. Therefore, if the Δ-side voltages to ground are measured by the transformer terminal voltage measuring means 603, and the voltage polarities are inverted for all three phases by the residual magnetic flux calculation means 604, then the phase of the Δ side voltages to ground is the same as for the primary Y-side phase-to-phase voltages.

Further, the residual magnetic flux calculation means 604 integrates the primary Y-side phase-to-phase voltages to calculate the phase-to-phase magnetic fluxes. Subsequent process is the same as that of the first embodiment described above, the explanation thereof is omitted.

On the other hand, in FIG. 8 (b) in which the phase sequence relation on the Y-side and Δ-side is −30°, for example, the Δ-side V phase voltage to ground 64 is directed in the same direction as the vector of the primary Y-side UV phase-to-phase voltage 7. The relations are similar between the Δ-side U phase voltage to ground 63 and the Y-side WU phase-to-phase voltage 8, and between the Δ-side W phase voltage to ground 65 and the Y-side VW phase-to-phase voltage 8, in other words, the two vectors of each combination are directed in the same direction.

Therefore, if the Δ-side voltages to ground are measured by the transformer terminal voltage measuring means 603, and the voltage polarities are of the same polarity for all three phases by the residual magnetic flux calculation means 604, then the phase of the Δ side voltages to ground is the same as for the primary Y-side phase-to-phase voltages. Subsequent process is the same as the above-described process.

[Advantageous Effect]

As a result of applying the third embodiment in which, even if a voltage division device is not installed on the transformer primary side, and the terminal voltage of the primary Y side cannot be measured by the transformer terminal voltage measuring means 603, by measuring the voltages to ground on the Δ side, from the measured voltages, the primary phase-to-phase magnetic fluxes can be calculated. Therefore, even if under these circumstances, a closing target of the circuit breakers 200 can be set similar to the first embodiment, a large magnetizing inrush current can be suppressed.

With regard to the DC voltage occurring after the transformer 300 has been interrupted, namely, a neutral point voltage, which is explained in the above-described embodiments, the neutral point voltage is a zero-phase voltage, as a result of this, the Δ side is not affected by the neutral point voltage. Consequently, by measuring the Δ-side voltages to ground and adjusting the polarities for three-phase to calculate the primary Y-side phase-to-phase voltages, subsequently integrating the calculated values, the result can be acquired, which is the same as the result of the case in which the primary Y-side voltages to ground are measured to calculate the phase-to-phase voltages, subsequently the calculated values are integrated to calculate the magnetic fluxes.

Fourth Embodiment

Figure 9:
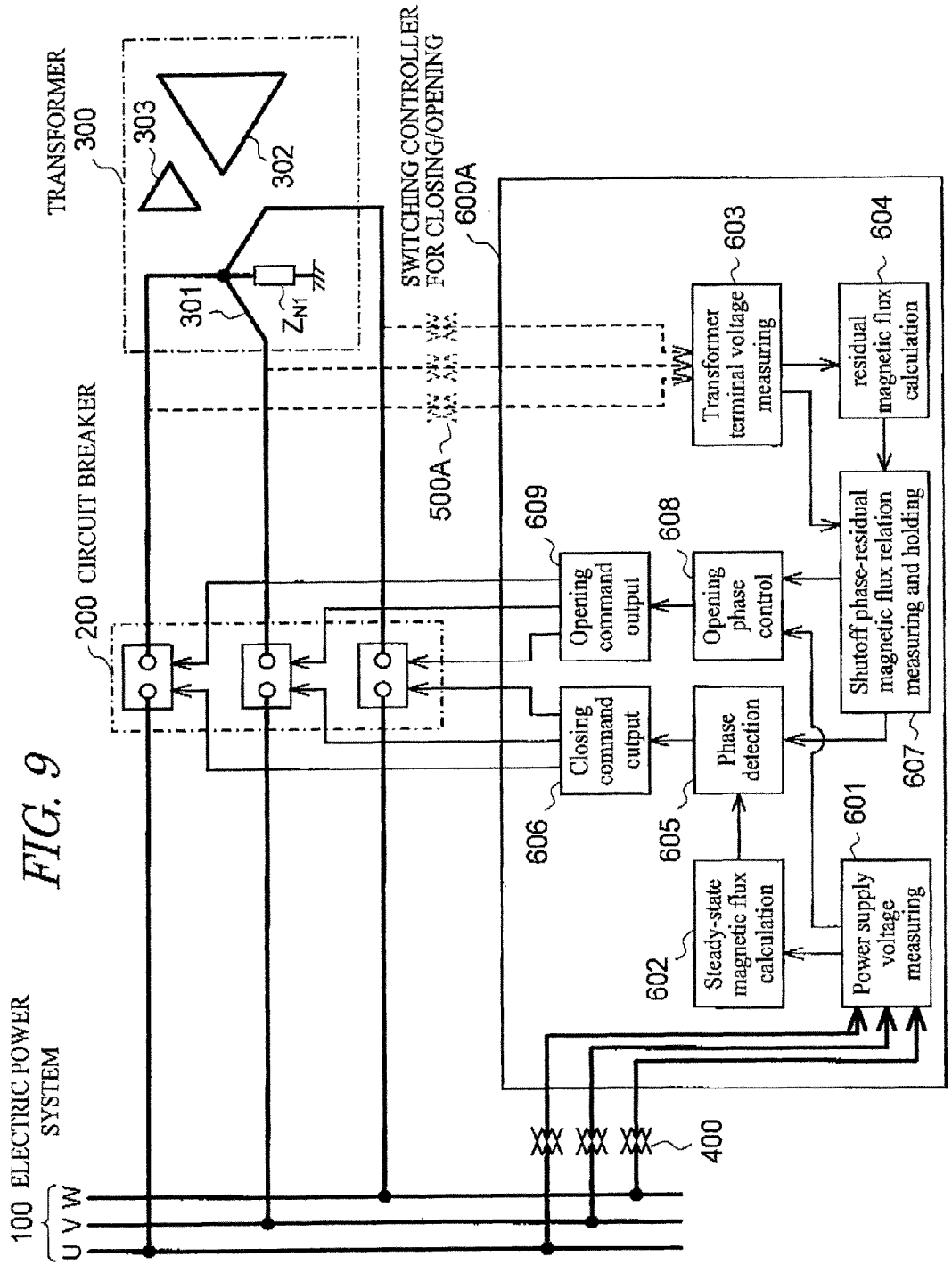
FIG. 9 is a block diagram showing the connection relation between a three-phase transformer, three-phase circuit breakers, and a switching controller for closing/opening in the fourth embodiment of the invention.
Figure 10:
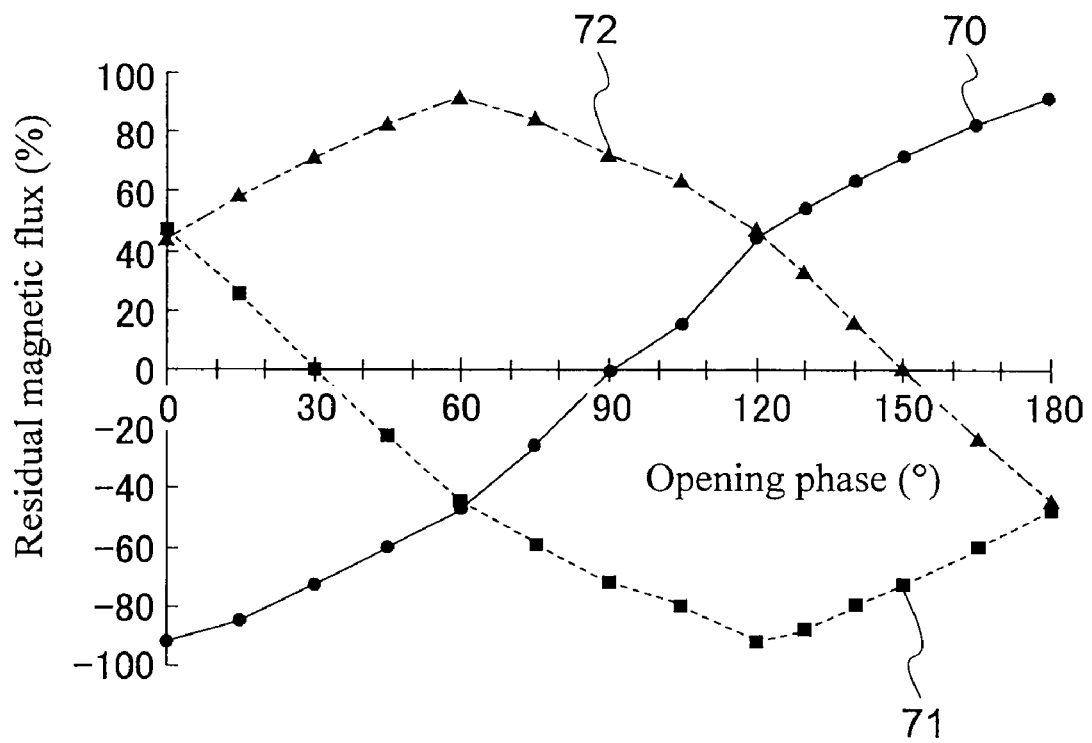
FIG. 10 is a waveform diagram showing the relation between the opening phase and each phase-to-phase residual magnetic flux when the three single-phase transformers are connected in Y and Δ connections, and are interrupted by the circuit breakers in the fourth embodiment of the invention.

Next, a magnetizing inrush current suppression device for transformer as a fourth embodiment of the invention is explained below referring to FIG. 9 and FIG. 10. Here, FIG. 9 is a block diagram showing the connection relation between a three-phase transformer, three-phase circuit breakers, and an switching controller for closing/opening. FIG. 10 is a waveform diagram that, when the three single-phase transformers are connected in Y and Δ connections, and are interrupted by the circuit breakers, shows an example of the phase-to-phase residual magnetic fluxes, which are calculated depending on the opening phase.

[Configuration]

In the fourth embodiment, as shown in FIG. 9, the power supply busbar 100, three-phase circuit breakers 200, and power supply voltage measuring device 400, is the same as that of the first embodiment, therefore, the fourth embodiment has a common configuration with the first embodiment in these points. However, the fourth embodiment is different from the first embodiment with regard to the following configuration of: three-phase transformer 300, switching controller for closing/opening 600A as a modification of the switching controller for closing 600, and detachable transformer terminal voltage measuring device 500A as a replacement for the fixed transformer terminal voltage measuring device 500.

In the fourth embodiment, with regard to the three-phase transformer 300, for example, the primary windings 301 are Y-connected, the secondary windings 302 are Δ-connected, and the tertiary windings 303 are Δ-connected.

Further, in the fourth embodiment, in ordinary operation, the transformer terminal voltage measuring device 500 is not installed for any of the primary terminal, secondary terminal, and tertiary terminal of the three-phase transformer 300. Instead of that, a detachable transformer terminal voltage measuring device 500A, which measures the terminal voltage, is connected with the primary terminal.

The transformer terminal voltage measuring device 500A, as described later, is removed from the primary terminal in ordinary operation, and is connected with the primary terminal when the characteristics of the phase-to-phase residual magnetic fluxes as shown in FIG. 10 are measured. Alternatively, the transformer terminal voltage measuring device 500A can be permanently installed. Further, the transformer terminal voltage measuring device 500A can be connected with the secondary terminal or tertiary terminal.

Further, the fourth embodiment has features in which the switching controller for closing/opening 600A as a modification of the switching controller for closing 600, when taking input of output voltages of the transformer terminal voltage measuring device 500A, causes the circuit breakers 200 to open plural times and measures in advance the characteristics of each phase-to-phase residual magnetic flux of the transformer for the closing phase of the circuit breakers as shown in FIG. 10. The switching controller for closing/opening 600A has a common configuration with the switching controller for closing 600 as concerns the configuration of the power supply voltage measuring means 601 through the closing command control means 606, but is newly provided with opening phase-residual magnetic flux relation measuring and holding means 607 (corresponding to "command means" and "measuring and holding means" of the invention), opening phase control means 608, and opening command output means 609 (corresponding to "opening output means" of the invention).

The opening phase-residual magnetic flux relation measuring and holding means 607 gives the command to the opening phase control means 608 as described later, for causing the circuit breakers 200 to open plural times in a state of being temporarily connected with the transformer terminal voltage measuring device 500A. Further, the opening phase-residual magnetic flux relation measuring and holding means 607 has functions of: acquiring the opening phase when the circuit breakers 200 open plural times through the transformer terminal voltage measuring means 603, and acquiring the phase-to-phase residual magnetic flux during the opening operation from the residual magnetic flux calculation means 604, and measuring and holding the relation between the opening phase and the phase-to-phase residual magnetic flux.

The opening phase control means 608 has functions of: inputting the output of the power supply voltage measuring means 601 and the opening command for the circuit breakers 200 from the opening phase-residual magnetic flux relation measuring and holding means 607, and controlling the opening phase of the main contacts of the circuit breakers 200 into a regular interval. The opening command output means 609 outputs an opening command to the operation mechanism driving the main contacts of the circuit breakers 200 such that the circuit breakers 200 open at the opening phase controlled into the regular interval by the opening phase control means 608.

[Action]

Next, an example of action of the fourth embodiment having the above-described configuration is explained below referring to FIG. 10. Once the circuit breakers 200 and the transformer 300 are installed in the electric power system, the circuit conditions of the electric power system (in FIG. 9, the circuit conditions from the power supply busbar 100 to the three-phase transformer 300) are always the same. Therefore, it is supposed that if the phase at which the circuit breakers 200 open is a regular phase, then the value of each phase-to-phase residual flux of the three-phase transformer 300 is a regular value.

In the fourth embodiment, in ordinary operation, the transformer terminal voltage measuring device 500 is not installed for any of the primary terminal, secondary terminal, and tertiary terminal of the three-phase transformer 300. Therefore, the circuit breakers 200 are caused to open plural times in a state in which the transformer terminal voltage measuring device 500A is temporarily connected with the transformer terminal, and the characteristics of each phase-to-phase residual magnetic flux of the transformer are measured in advance for the closing phase of the circuit breakers as shown in FIG. 10.

Specifically, for example, in a state in which the 500A is temporarily connected with the primary terminal of the three-phase transformer 300, the opening phase-residual magnetic flux relation measuring and holding means 607 gives a command to the opening phase control means 608 for causing the circuit breakers 200 to open plural times.

The opening phase control means 608, when acquiring the opening command to the circuit breakers 200 from the opening phase-residual magnetic flux relation measuring and holding means 607, controls the opening phase of the main contacts of the circuit breakers 200 into a predetermined value. The opening command output means 609 outputs an opening command to the operation mechanism driving the main contacts of the circuit breakers 200 such that the circuit breakers 200 open at the opening phase of the predetermined value controlled by the opening phase control means 608.

When the circuit breakers 200 has been caused to open, the transformer terminal voltage measuring means 603 measures the primary terminal voltages of the transformer 300 through the transformer terminal voltage measuring device 500A, and the opening phase of the measured voltages are sent to the opening phase-residual magnetic flux relation measuring and holding means 607. At the same time, the residual magnetic flux calculation means 604 converts the terminal voltages of respective phases measured by the transformer terminal voltage measuring means 603 into each of the phase-to-phase voltages, and integrates the phase-to-phase voltages to calculate the phase-to-phase residual magnetic fluxes. Alternatively, a method can be performed in which the phase voltages measured by the transformer terminal voltage measuring means 603 are integrated to calculate the residual magnetic fluxes for respective phases, and the calculated residual magnetic fluxes of respective phases are converted into the phase-to-phase residual magnetic fluxes.

The opening phase-residual magnetic flux relation measuring and holding means 607 acquires the opening phase of the voltages sent from the transformer terminal voltage measuring means 603, and acquires also the phase-to-phase residual magnetic flux from the residual magnetic flux calculation means 604, to measure and hold the relation between the opening phase and the phase-to-phase residual magnetic flux. The above-described process is repeated by the command from the opening phase-residual magnetic flux relation measuring and holding means 607, for causing the circuit breakers 200 to open plural times, resulting in that the characteristics of the phase-to-phase residual magnetic fluxes can be acquire in advance, which are calculated depending on the opening phase of the regular interval as shown in FIG. 10.

By using the phase-to-phase residual magnetic fluxes acquired in advance by the above-described process, a process the same as that of the first embodiment is performed. In other words, the phase detection means 605 detects phases at which, for each phase-to-phase, the steady-state magnetic fluxes from the steady-state magnetic flux calculation means 602 and the residual magnetic fluxes acquired in advance have the same polarity and magnitude. The two-phase circuit breakers 200 are caused to close at the detected phase point through the closing command control means 606. Among the residual magnetic fluxes acquired in advance, the residual magnetic flux of phase-to-phase showing the maximum value or minimum value is used for the subsequent part of the process the same as that of the first embodiment.

Further, in the process as described above in which the characteristics of the phase-to-phase residual magnetic fluxes are measured in advance, it is important to obtain the relation between the opening phase and the phase-to-phase residual magnetic flux. Therefore, it is unnecessary to measure the characteristics of the residual magnetic fluxes depending on the detailed opening phase of the regular interval as shown in FIG. 10.

[Advantageous Effect]

As a result of applying the fourth embodiment as described above, after the circuit breakers 200 interrupt the transformer 300, the characteristics of the residual magnetic fluxes can be acquire in advance in a state in which the transformer terminal voltage measuring device 500A is temporarily connected with the transformer terminal. Therefore, if the voltage information of the power supply voltage measuring device 400, even if the transformer terminal voltage measuring device 500 is not installed, the steady-state magnetic fluxes of the three-phase transformer 300 can be calculated. By using the steady-state magnetic fluxes and the phase-to-phase residual magnetic fluxes acquired in advance, the closing phase of the circuit breakers 200 can be controlled.

In other words, for busbar or the like in a substation, the power supply voltage measuring device 400 such as measuring device for busbar voltage is necessarily installed, for this reason, if the voltage information of the power supply voltage measuring device 400, even if the transformer terminal voltage measuring device 500 is not installed, the steady-state magnetic fluxes of the three-phase transformer can be calculated. Therefore, based on the relation between the steady-state magnetic fluxes and the phase-to-phase residual magnetic fluxes acquired in advance, the same as the first embodiment, the fourth embodiment also takes effect which enables suppression of large magnetizing inrush current.

Further, as described above, since the characteristics of the phase-to-phase residual magnetic fluxes can be acquired in advance, even if the terminal voltages of the three-phase transformer 300 cannot be measured for each opening operation, the relation between the steady-state magnetic fluxes and residual magnetic fluxes can be obtained, and the residual magnetic flux for each phase-to-phase can be estimated.

The invention claimed is:

1. A magnetizing inrush current suppression device for a three-phase transformer having primary windings Y-connected or Δ-connected and secondary windings and tertiary windings any of which are Δ-connected, the transformer being connected to a three-phase power supply via circuit breakers coupled with each of the three phases to interrupt power supplying to the transformer, the magnetizing inrush current suppression device comprising:

a first calculation part which is connected to the three phases of the power supply and calculates phase-to-phase steady-state magnetic flux of the three-phases of the power supply;

a second calculation part which is connected to the three phases in the primary windings side of the transformer and calculates phase-to-phase residual magnetic flux of the three phases in the primary windings side of the transformer when the circuit breakers interrupt the transformer;

a voltage-phase detection part which is connected to the first and second calculation parts and detects a voltage-phase at which polarity and magnitude of the phase-to-phase steady-state magnetic flux coincide with those of the phase-to-phase residual magnetic flux; and a closing control part which is connected to the voltage phase detection part and the circuit breakers and firstly causes the circuit breakers coupled with two of the three phases to close at the voltage phase detected by the phase detection part, and then causes the circuit breaker coupled with remaining one-phase to close, thereby suppressing a magnetizing inrush current occurring at start of energizing of the three-phase transformer.

2. The magnetizing inrush current suppression device according to claim 1, wherein
the first calculation part converts the respective voltages of the three-phases of the power supply into phase-to-phase voltages, and integrates the phase-to-phase voltages to calculate the phase-to-phase steady-state magnetic flux.

3. The magnetizing inrush current suppression device according to claim 1, wherein
the first calculation part directly measures respective phase-to-phase voltages of three-phases of the power supply, and integrates the phase-to-phase voltages to calculate the phase-to-phase steady-state magnetic flux.

4. The magnetizing inrush current suppression device according to claim 1, wherein
the second calculation part measures phase-to-ground voltages of the respective phases of the Δ-connected secondary or tertiary windings of the three-phase transformer, and integrates the phase-to-ground voltages to calculate the phase-to-phase magnetic flux in the primary windings side of the transformer.

5. The magnetizing inrush current suppression device according to claim 1, wherein
the closing control part causes the circuit breaker coupled with the remaining one phase to close when phase-to-phase voltage of the two phases becomes zero.

6. A magnetizing inrush current suppression device for a three-phase transformer having primary windings Y-connected or Δ-connected and secondary windings and tertiary windings any of which are Δ-connected, the transformer being connected to a three-phase power supply via circuit breakers coupled with each of the three phases to interrupt power supplying to the transformer, comprising:

a first calculation part which is connected to the three phases of the power supply and calculates phase-to-phase steady-state magnetic flux of the three-phases of the power supply;

an opening phase control part which controls opening phases of the circuit breakers such that the circuit breakers are opened at a regular interval;

an opening output part which is provided between the opening phase control part and the circuit breakers and causes the circuit breakers to open at the opening phases controlled by the opening phase control part;

a second calculation part which is connected to the three phase transformer at any of primary, secondary or tertiary windings side of the transformer and calculates phase-to-phase residual magnetic flux of the three phases in any of the primary, secondary or tertiary windings side when the circuit breakers are opened and interrupt the transformer;

a command and data-holding part which transmits opening commands of the circuit breakers to the opening phase control part, acquires data of the opening phases from the circuit breakers opened by the opening output part, and the phase-to-phase residual magnetic flux at the opening phases from the second calculation part, measures the relative value between the opening phases and the residual magnetic flux and holds characteristics data of the residual magnetic flux;

a voltage-phase detection part which is connected to the first calculation part and the command and data-holding part and detects a voltage-phase, at which polarity and magnitude of the phase-to-phase steady-state magnetic flux acquired from the first calculation part coincide with those of the phase-to-phase residual magnetic flux at a predetermined value acquired from the command and data-holding part; and a closing control part which is connected to the voltage-phase detection part and the circuit breakers and firstly causes the circuit breakers coupled with two of the three phases to close at the voltage-phase detected by the voltage-phase detection part, and then causes the circuit breaker coupled with remaining one-phase to close, thereby suppressing a magnetizing inrush current occurring at start of energizing of the three-phase transformer.

7. The magnetizing inrush current suppression device according to claim 6, wherein the closing control part causes the circuit breaker coupled with the remaining one phase to close when phase-to-phase voltage of the two phases becomes zero.

8. A control method of magnetizing inrush current suppression device for a three-phase transformer having primary windings Y-connected or Δ-connected and secondary windings and tertiary windings any of which are Δ-connected, the transformer being connected to a three-phase power supply via circuit breakers coupled with each of the three phases to interrupt power supplying to the transformer, the control method comprising the steps of:

calculating the phase-to-phase steady-state magnetic flux of the three-phases of the power supply by a first calculation part connected to the three phases of the power supply;

calculating phase-to-phase residual magnetic flux of the three phases in the primary windings side of the transformer when the circuit breakers interrupt the transformer by a second calculation part connected to the three phases in the primary windings side of the transformer;

detecting a voltage-phase at which polarity and magnitude of the phase-to-phase steady-state magnetic flux coincide with those of the phase-to-phase residual magnetic flux by a voltage-phase detection part connected to the first and second calculation parts; and firstly causing the circuit breakers coupled with two of the three phases at the voltage phase detected and then causing the circuit breaker coupled with remaining one-phase to close by a closing control part connected to the voltage-phase detection part and the circuit breakers, thereby suppressing a magnetizing inrush current occurring at the start of energizing of the three-phase transformer.

9. The magnetizing inrush current suppression device according to claim 8, wherein the closing control part causes the circuit breaker coupled with the remaining one phase to close when phase-to-phase voltage of the two phases becomes zero.

10. A control method of magnetizing inrush current suppression device for a three-phase transformer having primary windings Y-connected or Δ-connected and secondary windings and tertiary windings any of which are Δ-connected, the transformer being connected to a three-phase power supply via circuit breakers coupled with each of the three phases to interrupt power supplying to the transformer, the control method comprising the steps of:

calculating the phase-to-phase steady-state magnetic flux of the three-phases of the power supply by a first calculation part connected to the three phases of the power supply;

controlling opening phases of the circuit breakers such that the circuit breakers are opened at a regular interval by an opening phase control part based on opening commands for the circuit breakers transmitted from a command and data-holding part;

causing the circuit breaker to open at the opening phases by an opening output part provided between the opening phase control part and the circuit breakers;

calculating phase-to-phase residual magnetic flux of the three phases in any of the primary, secondary or tertiary side of the transformer when the circuit breakers are opened and interrupt the transformer by a second calculation part connected to the three phases at any of primary, secondary or tertiary windings side of the transformer;

acquiring data of the opening phases from the circuit breakers opened by the opening output part, and the phase-to-phase residual magnetic flux at the opening phases from the second calculation part, measuring the relative value between the opening phases and the phase-to-phase residual magnetic flux and holding characteristics data of the phase-to-phase residual magnetic flux by the command and data-holding part;

detecting a voltage-phase at which polarity and magnitude of the phase-to-phase steady-state magnetic flux acquired from the first calculation part coincide with those of the phase-to-phase residual magnetic flux at a predetermined value acquired from the data-holding part by a voltage-phase detection part connected to the first calculation part and the command and data-holding part; and firstly causing the circuit breakers coupled with two of the three phases to close at the voltage phase, and then causing the circuit breaker coupled with remaining one-phase to close by a closing control part connected to the voltage-phase detection part and the circuit breakers, thereby suppressing a magnetizing inrush current occurring at start of energizing of the three-phase transformer.

11. The magnetizing inrush current suppression device according to claim 10, wherein the closing control part causes the circuit breaker coupled with the remaining one phase to close when phase-to-phase voltage of the two phases becomes zero.

* * * * *